Oct. 5, 1937.  C. S. AIKINS  2,095,048
FISHHOOK GUARD
Filed Oct. 3, 1936
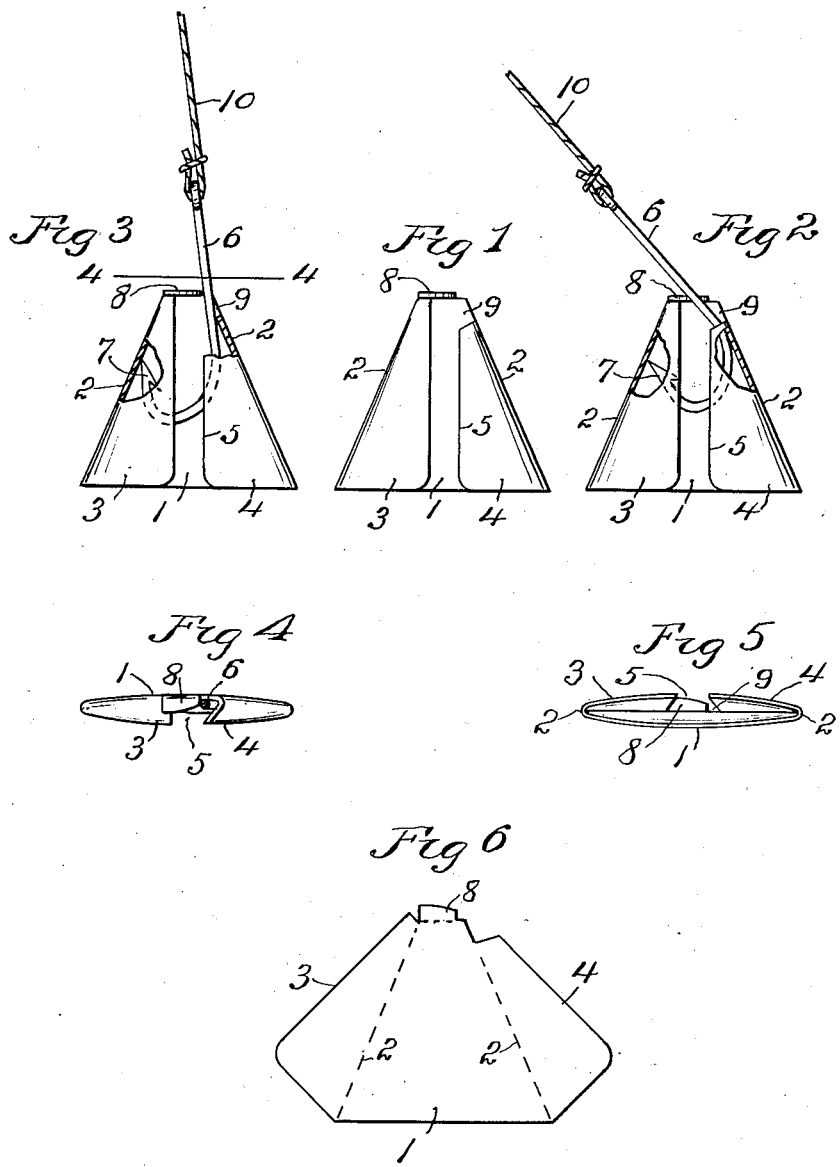
INVENTOR
Charles S. Aikins
BY
Warren D. House
His ATTORNEY Patented Oct. 5, 1937

2,095,048

UNITED STATES PATENT OFFICE 2,095,048

FISHHOOK GUARD

Charles S. Aikins, Kansas City, Mo.

Application October 3, 1936, Serial No. 103,866

2 Claims. (Cl. 43—38)

My invention relates to improvements in fish hook guards.

One of the objects of my invention is the provision of a novel guard to be applied on a fish hook so as to cover the barbed end thereof and prevent its being caught on the person, clothing or any article when the hook is attached to a line or separately carried.

A further object of my invention is the provision of a novel fish hook guard which is simple, cheap to make, light, durable, easy to attach to or remove from a hook, and which is efficient in operation.

The novel features of my invention are hereinafter fully described and claimed.

In the accompanying drawing, which illustrates the preferred embodiment of my invention, Fig. 1 is a front elevation of my improved guard.

Fig. 2 is a view similar to Fig. 1, partly broken away, showing a fish hook inserted into but not in locked engagement with the guard.

Fig. 3 is a view similar to Fig. 2, showing the fishhook in locked engagement with the guard.

Fig. 4 is a section on the plane of the line 4—4 of Fig. 3, with the broken away parts restored.

Fig. 5 is an under view of the guard.

Fig. 6 is a plan view of the blank from which the guard is formed.

Similar characters of reference designate similar parts in the different views.

The guard may be formed from a blank of the shape shown in Fig. 6, the blank being cut from any sheet substance of a suitable nature, such as sheet steel, brass, zinc or aluminum. It is provided with a back portion 1 having upwardly converging longitudinal edges 2.

Two lips 3 and 4 are spaced from and extend at one side of the back portion 1 from the converging edges 2 respectively toward and spaced from each other, at their free edges, to form between them a longitudinal passage 5 adapted to receive therethrough the shank 6 of a fish hook.

The lips 3 and 4 where they join the back portion 1 at the edges 2, are so spaced apart as to be adapted to respectively engage at such joining places the barbed end 7 and the shank 6 of the fish hook, as shown in Figs. 2 and 3.

A locking projection 8, comprising a flange extends transversely adjacent to the passage 5 at the smaller end of the back portion 1. The projection 8 is adjacent to and spaced from the adjacent end of the lip 4, thus providing between the lip 4 and the projection 8 an opening 9 into which the shank 6 of the hook is adapted to be sprung so as to have locked engagement with the projection 8, at one end thereof, and with the lip 4, as shown in Fig. 3, whereby the fish hook is securely held in the guard.

In the formation of the guard from the blank, shown in Fig. 6, the lips 3 and 4 are folded along the dotted lines 2 toward each other into the position shown in Fig. 1, in which the lips are spaced from the back portion 1 and from each other, as shown in Fig. 5.

In applying the guard to a hook, the barbed end portion 7 of the fish hook is inserted at the larger end of the guard between the lip 3 and the back portion 1, with the shank 6 extending upwardly and through the passage 5, the lower portion of the shank 6 and a part of the curved part of the fish hook being inserted between the lip 4 and the back portion 1, and the shank 6 inclined to the left and over the flange projection 8, as shown in Fig. 2.

When the hook has been drawn upwardly until the shank 6 and barbed end 7 tightly respectively engage the lips 3 and 4 at their places of junction with the back portion 1, as in Fig. 2, the shank 6 is sprung to the right into the opening 9, as in Fig. 3.

When so disposed, in the opening 9, the shank 6 in a state of tension lockingly engages the lip 4 and the adjacent end edge of the projection 8, thus securely holding the guard on the hook.

With hooks that have the barbed end portion bent laterally, the lips 3 and 4 compress such bent portion between them and the back portion 1, thereby increasing the holding engagement of the guard on the hook.

The guard may be used when the hook is separately carried, or when the hook has attached to it the usual snood 10.

To remove the guard from the hook, the hook may be forced straight down from the position shown in Fig. 3, thereby releasing the hook from tight engagement with the guard, when it may be easily slid therefrom. Or, if desired, the shank may be swung out of the locking position, shown in Fig. 3 to the unlocked position, shown in Fig. 2, from which position it can be easily moved downwardly out of engagement with the guard.

Modifications of my invention, within the scope of the appended claims, may be made without departing from the spirit of my invention.

What I claim is:—

1. A fish hook guard comprising a back portion, two lips spaced from and extending at one side of the back portion from the longitudinal edges thereof respectively toward and spaced from each other to form between them a longitudinal passage adapted to receive therethrough the shank of a fish hook, said lips where they join said back portion being so spaced apart as to be adapted to respectively tightly engage at such joining places the shank and barbed end of the fish hook, and a locking projection on said side of said back portion adjacent to one end of said passage and adjacent to but spaced from the adjacent end of one of said lips so as to provide between said lip and said projection an opening into which the shank of the hook is adapted to be sprung and have locked engagement with said projection and said lip.

2. A fish hook guard comprising a back portion having longitudinal converging edges, two lips spaced from and extending at one side of said back portion from said edges respectively toward and spaced from each other to form between them a longitudinal passage adapted to receive therethrough the shank of a fish hook, said lips where they join said back portion being so spaced apart as to be adapted to respectively tightly engage at such joining places the shank and barbed end of the fish hook, and a locking projection on said side of said back portion at the smaller end thereof and near the adjacent end of said passage and adjacent to and spaced from the adjacent end of one of said lips so as to provide between said lip and said projection an opening into which the shank of the hook is adapted to be sprung and have locked engagement with said lip and said projection.

CHARLES S. AIKINS.